US006693060B2

(12) United States Patent
Park et al.

(10) Patent No.: US 6,693,060 B2
(45) Date of Patent: Feb. 17, 2004

(54) MODIFIED θ-AL$_2$O$_3$-SUPPORTED NICKEL REFORMING CATALYST AND ITS USE FOR PRODUCING SYNTHESIS GAS FROM NATURAL GAS

(75) Inventors: Sang-Eon Park, Daejeon (KR); Ki-Won Jun, Daejeon (KR); Hyun-Seog Roh, Daejeon (KR); Seung-Chan Baek, Changwon-shi (KR); Young-Sam Oh, Incheon (KR); Young-Soon Baek, Incheon (KR); Ri-Sang Choi, Busan (KR); Taek-Yong Song, Incheon (KR)

(73) Assignees: Korea Research Institute of Chemical Technology, Daejeon (KR); Korea Gas Corporation, Kyunggi-do (KR); Kyungdong City Gas Co., Ltd., Woolsan (KR)

( * ) Notice: Subject to any disclaimer, the term of this patent is extended or adjusted under 35 U.S.C. 154(b) by 0 days.

(21) Appl. No.: 10/143,669

(22) Filed: May 13, 2002

(65) Prior Publication Data

US 2003/0032554 A1 Feb. 13, 2003

(30) Foreign Application Priority Data

May 18, 2001 (KR) .......................................... 2001-27240

(51) Int. Cl.[7] .......................... B01J 23/40; B01J 23/42; B01J 23/58; B01J 23/56; B01J 23/00
(52) U.S. Cl. ....................... 502/337; 502/327; 502/328; 502/330; 502/332; 502/335; 502/349; 502/355; 502/415; 502/439
(58) Field of Search ............................... 502/327, 328, 502/330, 332, 335, 337, 349, 355, 415, 439

(56) References Cited

U.S. PATENT DOCUMENTS

| | | | | | |
|---|---|---|---|---|---|
| 3,644,198 A | * | 2/1972 | Wilhelm | ...................... | 208/111 |
| 4,046,715 A | * | 9/1977 | Wilhelm | ................. | 252/466 B |
| 4,079,097 A | * | 3/1978 | Antos | ....................... | 260/683.3 |
| 4,471,144 A | * | 9/1984 | Arena | .......................... | 568/863 |
| 4,529,718 A | * | 7/1985 | Dupin | ......................... | 502/439 |
| 4,722,920 A | * | 2/1988 | Kimura et al. | ............... | 502/439 |
| 4,891,350 A | * | 1/1990 | Chopin et al. | .............. | 502/439 |
| 4,918,042 A | * | 4/1990 | Takada et al. | .............. | 502/314 |
| 4,920,089 A | * | 4/1990 | Van Beek et al. | .......... | 502/335 |
| 4,962,280 A | * | 10/1990 | Tijburg et al. | .............. | 502/439 |
| 4,968,660 A | * | 11/1990 | Tijburg et al. | .............. | 502/303 |
| 5,002,909 A | * | 3/1991 | Montino et al. | ............. | 501/105 |
| 5,081,095 A | * | 1/1992 | Bedford et al. | ............. | 502/304 |
| 5,102,850 A | * | 4/1992 | Sanchez et al. | ............. | 502/261 |
| 5,155,085 A | * | 10/1992 | Hamano et al. | ............ | 502/303 |
| 5,545,602 A | * | 8/1996 | Nelson et al. | .............. | 502/314 |
| 5,597,771 A | * | 1/1997 | Hu et al. | ..................... | 502/304 |
| 5,849,977 A | * | 12/1998 | Kocal et al. | ................. | 585/729 |
| 5,877,106 A | * | 3/1999 | Kharas et al. | ............... | 501/127 |
| 5,972,820 A | * | 10/1999 | Kharas et al. | ............... | 501/127 |
| 6,326,329 B1 | * | 12/2001 | Nunan | ......................... | 502/242 |
| 6,514,904 B1 | * | 2/2003 | Moser et al. | ................ | 502/323 |

FOREIGN PATENT DOCUMENTS

| | | |
|---|---|---|
| KR | 2001-0046300 | 6/2001 |
| KR | 2002-0021721 | 3/2002 |
| KR | 2002-0026074 | 4/2002 |

* cited by examiner

*Primary Examiner*—Cam N. Nguyen
(74) *Attorney, Agent, or Firm*—Finnegan, Henderson, Farabow, Garrett & Dunner, LLP

(57) ABSTRACT

A modified θ–Al$_2$O$_3$-supported nickel reforming catalyst and its use for producing synthesis gas from natural gas, more specifically to a nickel reforming catalyst expressed by the following formula 1, having improved coke resistance, high-temperature catalysis stability and catalytic activity, which is prepared by coating nickel or mixture of nickel and cocatalyst ($M_1$—$M_2$—Ni) on a θ-Al$_2$O$_3$ support modified with metal ($M_3$—$M_4$—ZrO$_2$/θ-Al$_2$O$_3$), and its use for producing synthesis gas from natural gas through steam reforming, oxygen reforming or steam-oxygen reforming, $$M_1\text{—}M_2\text{—}Ni/M_3\text{—}M_4\text{—}ZrO_2/\theta\text{-}Al_2O_3 \qquad (1)$$

wherein $M_1$ is an alkali metal, each of $M_2$ and $M_3$ is an alkaline earth metal; and $M_4$ is a IIIB element or a lanthanide.

3 Claims, No Drawings

MODIFIED θ-Al$_2$O$_3$-SUPPORTED NICKEL REFORMING CATALYST AND ITS USE FOR PRODUCING SYNTHESIS GAS FROM NATURAL GAS

FIELD OF THE INVENTION

The present invention relates to a modified θ-Al$_2$O$_3$-supported nickel reforming catalyst and its use for producing synthesis gas from natural gas. More particularly, the present invention is to provide a nickel reforming catalyst expressed by the following formula 1, having improved coke resistance, high-temperature catalysis stability and catalytic activity, which is prepared by coating nickel or mixture of nickel and cocatalyst (M$_1$—M$_2$—Ni) on a θ-Al$_2$O$_3$ support modified with metal (M$_3$—M$_4$—ZrO$_2$/θ-Al$_2$O$_3$), and its use for producing synthesis gas from natural gas through steam reforming, oxygen reforming or steam-oxygen reforming, $$M_1\text{—}M_2\text{—}Ni/M_3\text{—}M_4\text{—}ZrO_2/\theta\text{-}Al_2O_3 \quad (1)$$

wherein M$_1$ is an alkali metal; each of M$_2$ and M$_3$ is an alkaline earth metal; and M$_4$ is a IIIB element or a lanthanide.

BACKGROUND OF THE INVENTION

Steam reforming, which produces a mixture (synthesis gas) of hydrogen and carbon monoxide from methane (natural gas), has become an important and fundamental chemical industrial process from long time ago. Synthesis gas produced by steam reforming of methane is widely used for producing methanol, hydrogen, ammonia, etc. Recently, it has been used for producing liquid fuel or oxygen-including compounds.

The biggest problem in the steam reforming is deactivation of reforming catalyst due to deposition of carbon. The carbon deposition can be calculated thermodynamically from molar ratios of hydrogen to carbon and oxygen to carbon in the product. Therefore, in steam reforming of methane, excess amount of steam is required to increase molar ratios of hydrogen to carbon and oxygen to carbon, in order to prevent deactivation of reforming catalyst. This promotes an aqueous gasification enough to obtain a synthesis gas with molar ratio of hydrogen to carbon monoxide larger than 3:1. Therefore, this process may be suitable for producing ammonia or high-concentration hydrogen. The current industrial steam reforming process of methane is being carried out under the condition of 730–860° C. of a temperature, 20–40 atm of a pressure and 1:4–6 of methane-to-steam molar ratio.

And, for the industrial catalyst for the steam reforming, nickel catalyst is used D dominantly. A superior industrial reforming catalyst should have coke resistance and thermal and mechanical stability. For this purpose, selection of suitable support such as α-alumina is very important.

The inventors suggested reforming reactions using modified zirconia-supported nickel catalyst [Korea Patent Application No. 99-50013; Korea Patent Application No. 2000-0054443; & Korea Patent Application No 2000-0057688]. Korea Patent Application No. 99-50013 discloses a modified zirconia-supported nickel catalyst and carbon dioxide reforming using it. Korea Patent Application No. 2000-0054443 discloses a cerium-modified zirconia-supported nickel catalyst and steam reforming using it. Further, Korea Patent Application No. 2000-0057688 discloses a modified zirconia-supported nickel catalyst and steam-oxygen reforming using it. The modified zirconia-supported nickel catalyst showed better activity and stability than those of conventional reforming catalysts when used in carbon dioxide reforming, steam reforming and steam-oxygen reforming even under severe condition (high space velocity and low steam-to-methane ratio) and at high temperature. Despite of good activity and stability, zirconia is not suitable to be used in reforming catalyst, because it is more expensive than alumina. Accordingly, it is required to use the more cost-effective θ-Al$_2$O$_3$ support and modify it with zirconia. Then, if it is coated with nickel catalyst, an inexpensive catalyst with good activity and stability can be obtained.

SUMMARY OF THE INVENTION

Inventors have developed a nickel reforming catalyst by coating θ-Al$_2$O$_3$ base support with zirconia modified with alkaline earth metal (M$_3$) and IIIB element or lanthanide metal (M$_4$), and coating nickel and alkali metal (M$_1$) or alkaline earth metal (M$_2$) cocatalyst. When this reforming catalyst was used in various reforming reactions of natural as, i.e., steam reforming, oxygen reforming or steam-oxygen reforming, it has showed equal or superior activity and stability compared with the modified zirconia-supported nickel catalyst we had suggested in Korea Patent Application No. 99-50013.

Accordingly, an object of the present invention is to provide a nickel reforming catalyst using θ-Al$_2$O$_3$ as base support, and its use for producing synthesis gas through reforming reaction.

DETAILED DESCRIPTION OF THE INVENTION

The present invention is to provide a nickel reforming catalyst expressed by the following formula 1, which is used for producing synthesis gas mixture of carbon monoxide and hydrogen from natural gas, $$M_1\text{—}M_2\text{—}Ni/M_3\text{—}M_4\text{—}ZrO_2/\theta\text{-}Al_2O_3 \quad (1)$$

wherein M$_1$, is an alkali metal; each of M$_2$ and M$_3$ is an alkaline earth metal; and M$_4$ is a IIIB element or a lanthanide.

Synthesis gas mixture of carbon monoxide and hydrogen may be produced from methane in the presence of the nickel reforming catalyst by steam reforming, oxygen reforming or steam-oxygen reforming, under the condition of 0–6 of methane-to-steam molar ratio, 0–1 of methane-to-oxygen molar ratio, 600–1000° C. of a reaction temperature, 0.5–20 atm of a reaction pressure and 1,000–1,000,000 cc/hr·g-cat of a space velocity.

Hereunder is given a more detailed description of the present invention. This invention relates to a reforming catalyst expressed by formula 1 and its use for producing synthesis gas by steam reforming, oxygen reforming or steam-oxygen reforming of natural gas.

The modified θ-Al$_2$O$_3$-supported nickel reforming catalyst according to the present invention is prepared by coating a modified zirconia (M$_3$—M$_4$—ZrO$_2$) on θ-Al$_2$O$_3$ base support and coating nickel and cocatalyst (M$_1$—M$_2$—Ni) on it. Here, nickel is added preferably in the range of 3 to 20 wt. % based to θ-Al$_2$O$_3$. Each of M$_1$ and M$_2$ cocatalysts is added preferably in the range of 0 to 0.2 and 0 to 4 molar ratios based to nickel, respectively. Each of M$_3$ and M$_4$ is added preferably in the range of 0 to 1.0 and 0.01 to 1.0 molar ratios based to zirconium (Zr), respectively. Zirconia (ZrO$_2$) is added preferably in the range of 0.01 to 1.0 molar ratio based to θ-Al$_2$O$_3$.

$M_1$ is an alkali metal chosen from sodium, potassium and cesium; each of $M_2$ and $M_3$ is an alkaline earth metal chosen from calcium, magnesium and strontium, and $M_4$ is a IIIB element chosen from yttrium, lanthanum and cerium, or lanthanide, wherein $M_3$ and $M_4$ are cocatalysts for enhancing coke resistance and catalytic activity.

The reforming catalyst according to the present invention may be prepared by coprecipitation, precipitation, sol-gel method, molten-salt or impregnation method. $\theta$-$Al_2O_3$ is modified with zirconia to obtain support, coprecipitation or sol-gel method is preferable. When nickel and cocatalyst are coated on the support, molten-salt and impregnation methods are preferable.

Preparation of modified $\theta$-$Al_2O_3$ support through coprecipitation is as follows. 1 M zirconyl chloride aqueous solution is purified by recrystallization from hydrochloric acid. 1 M nitrate solution of the metal to be modified on the $\theta$-$Al_2O_3$ base support is added to this solution. After strongly stirring the mixture at 50–70° C. for 4–8 hr, 29.8% ammonia water is added until pH reaches 10. The precipitate is filtered and washed with 5% ammonia water until no chloride ion is observed. It is further washed with distilled water. The filtered precipitate is placed in a drying oven and dried at 90–100° C. for 10–12 hr. Then, it is put in a furnace and calcined in 700–900° C. of air for 7–9 hr to obtain the modified $\theta$-$Al_2O_3$ support.

Preparation of nickel- and cocatalyst-supported modified $\theta$-$Al_2O_3$ support through impregnation is as follows. Modified ($\theta$-$Al_2O_3$ support powder is added in distilled water and stirred to obtain a slurry. 1 M nitrate solution of nickel and the metal used as cocatalyst is added to this slurry. The mixture is stirred at 25° C. for 5–7 hr. Then, the flask containing this mixture solution is connected to a rotary vacuum evaporator in order to evaporate water under pressure of 90–120 Torr and temperature of 70–90° C. The obtained catalyst precursor powder is dried in a drying oven at 100° C. for 12 hr and calcined at 400–500° C. in air for about 4 hr to obtain the nickel reforming catalyst.

Preparation of nickel- and cocatalyst-supported modified $\theta$-$Al_2O_3$ support through molten-salt method is as follows. The fact that nickel and cocatalyst metal precursor have low melting temperature is used. In order to obtain uniform and thin coating of metal component on the modified $\theta$-$Al_2O_3$ support, the support powder and the metal precursor powder is finely ground and mixed well at room temperature. Then, the metal precursor component is decomposed through a well-defined heat treatment process to obtain the catalyst. The heat treatment process is as follows. All nitrates in the catalyst precursor powder are melt by heating it at 2° C./min from room temperature to 400° C. under argon flow of 100 mL/min in a furnace. The nitrates are decomposed at 400° C. for 4 hr. Then, after changing argon flow to dry air flow, the temperature is increased to 650° C. at 5° C./min. The product is treated for 4 hr at 650° C. The typical catalyst obtained from this method is Ni—Ca/Ce—$ZrO_2$/$\theta$-$Al_2O_3$ catalyst, which is prepared by using nitrates of nickel (melting point: 56.7° C.) and calcium (melting point: 39.7° C.) as metal precursor.

The above methods are only examples of preparing modified $\theta$-$Al_2O_3$-supported nickel reforming catalysts according to the present invention. Other known preparing methods may be used if necessary.

Reaction condition of producing synthesis gas from natural gas using the nickel reforming catalyst according to the present invention is as follows The nickel reforming catalyst expressed by formula 1 can be used in steam reforming, oxygen reforming or steam-oxygen reforming to prepare synthesis gas mixture of carbon monoxide and hydrogen from methane. In the reforming reactions, methane-to-steam molar ratio is preferred to be 0–6, and methane-to oxygen molar ratio is preferred to be 0–1. To be more specific, in the steam reforming, the methane-to-steam molar ratio is preferred to be 1–6; in the oxygen reforming, the methane-to-oxygen molar ratio is preferred to be 0.1–1; and in the steam-oxygen reforming, the methane-to-steam molar ratio is preferred to be 1–5 and the methane-to-oxygen molar ratio is preferred to be 0.1–1. The reaction temperature is 600–1000° C. and the reaction pressure is 0.5–20 atm. The reaction gas is injected at 1,000–1,000,000 cc/hr·g-cat of space velocity.

As described above, the present invention provides a new industrial catalyst, which has equal or superior activity and stability compared to the expensive conventional modified zirconia-supported nickel reforming catalyst, by coating modified zirconia on $\theta$-$Al_2O_3$ support and supporting nickel or mixture of nickel and cocatalyst on the support.

The following examples are intended to be illustrative of the present invention. However, they should not be construed as limiting the scope of this invention.

PREPARING EXAMPLE 1

Preparation of $\theta$-$Al_2O_3$ Support Modified with Alkaline Earth Metal and Zirconia Modified $\theta$-$Al_2O_3$ support was prepared by coprecipitation using alkaline earth metal, such as calcium and magnesium, and zirconia.

Firstly, zirconyl chloride (Aldrich, 98%) was diluted to 1 M aqueous solution and purified by recrystallization from hydrochloric acid. After mixing the result with 1 M alkaline earth metal nitrate solution, the mixture was strongly stirred at 60° C. for 6 hr. After adding $\theta$-$Al_2O_3$ support and 29.8% ammonia water (Fisher Scientific) until pH reaches 10, the precipitate was filtered and washed with 5% ammonia water until no chloride ion was detected. Then, it was washed with distilled water. The filtered precipitate was dried at 100° C. for 12 hr in a drying oven. The obtained powder was finely ground in mortar, and calcined in 900° C. of air for in a furnace to obtain modified $\theta$-$Al_2O_3$ supports. The obtained modified $\theta$-$Al_2O_3$ supports were Ca—$ZrO_2$/$\theta$-$Al_2O_3$ (Ca/Zr=½) and Mg—$ZrO_2$/$\theta$-$Al_2O_3$ (Mg/Zr=¼). The content of Ca—$ZrO_2$ and Mg—$ZrO_2$ was 5 wt. % relative to $\theta$-$Al_2O_3$.

PREPARING EXAMPLE 2

Preparation of $\theta$-$Al_2O_3$ Support Modified with IIIB Element or Lanthanide and Zirconia Modified $\theta$-$Al_2O_3$ support was prepared by sol-gel method using IIIB element or lanthanide, such as yttrium, lanthanum and cerium, and zirconia.

Nitrate of the metal component to be modified was added to 1L of distilled water at 20° C., so that its molar ratio against zirconia is 1:4. After dissolving uniformly for 5 hr, θ-Al$_2$O$_3$ support was added and molar equivalent of citric acid (against the metal nitrate) was added at the same temperature. After completely dissolving for 6 hr, molar equivalent of ethylene glycol was added and the mixture was stirred for 6 hr. Then, the mixture solution was condensed to highly viscous phase by suction-filtering at 80–100° C., and was dried in a microwave oven. The dry support powder was finely ground in mortar, and was calcined in 300° C. of air for 5 hr, and then in 900° C. of air for 5 hr in a furnace. The obtained modified θ-Al$_2$O$_3$ supports were Ce—ZrO$_2$ (1:4)/θ-Al$_2$O$_3$, La—ZrO$_2$ (1:4)/θ-Al$_2$O$_3$ and Y—ZrO$_2$ (1:4)/θ-Al$_2$O$_3$. The content of θ-Al$_2$O$_3$ modifying component was set to be 5 wt. %.

PREPARING EXAMPLE 3

Preparation of θ-Al$_2$O$_3$ Support Modified with Alkaline Earth Metal, IIIB Element or Lanthanide and Zirconia θ-Al$_2$O$_3$ support modified with an alkaline earth metal, IIIB element or lanthanide and zirconia was prepared by coprecipitation as in Preparing Example 2. The obtained modified θ-Al$_2$O$_3$ support was Ce—Mg—ZrO$_2$/θ-Al$_2$O$_3$, and metal content was 20 mol % against zirconia. The content of Ce—Mg—ZrO$_2$ was set to be 5 wt. % against θ-Al$_2$O$_3$.

EXAMPLES 1–10

Preparation of Nickel Reforming Catalyst by Impregnation

Nickel and cocatalyst were impregnated on the modified θ-Al$_2$O$_3$ supports prepared in Examples 2 & 3.

Firstly, 20 g of modified θ-Al$_2$O$_3$ support powder was put in a 500 mL round-bottom flask containing 200 mL of distilled water. After making zirconia slurry by stirring this mixture, 1M nickel nitrate solution and cocatalyst component was added and stirred for 6 hr at 25° C. Then, the flask containing the solution was connected to a rotary vacuum evaporator. The rotary vacuum evaporator was rotated under 100 Torr and 80° C. to evaporate water. The obtained catalyst precursor powder was dried in 100° C. of drying oven for 12 hr. Then, it was calcined in 500° C. of air in a furnace for 4 hr to obtain the modified θ-Al$_2$O$_3$-supported nickel reforming catalyst.

In Ni/Ce—ZrO$_2$ (1:4)/θ-Al$_2$O$_3$ obtained from the impregnation, Ce—ZrO$_2$ content was 5 wt. % against θ-Al$_2$O$_3$ support, and the nickel content was 3 wt. % (Example 1), 6 wt. % (Example 2), 12 wt. % (Example 3) and 15 wt. % (Example 4) against θ-Al$_2$O$_3$. Other than Ni/Ce—ZrO$_2$ (1:4)/θ-Al$_2$O$_3$, Ni/La—ZrO$_2$ (1:4)/θ-Al$_2$O$_3$ (Example 5), Ni—Ca (1:1)/Ce—ZrO$_2$ (1:4)/θ-Al$_2$O$_3$ (Example 6), Ni—Mg (1:1)/La—ZrO$_2$ (1:4)/θ-Al$_2$O$_3$ (Example 7), Ni—Ca (1:1)/Y—ZrO$_2$(1:4)/θ-Al$_2$O$_3$ (Example 8), Ni—Ca (1:1)/Ce—Mg—ZrO$_2$ (1:1:3)/θ-Al$_2$O$_3$ (Example 9) and Ni—Ca—Cs (1:1:0.1)/La—ZrO$_2$ (1:4)/θ-Al$_2$O$_3$ (Example 10) were prepared. In these catalysts, the nickel content was set to be 12 wt. % against θ-Al$_2$O$_3$.

COMPARATIVE EXAMPLES 1–4

Preparation of Ni/Ce—ZrO$_2$ (1:4)/θ-Al$_2$O$_3$, Ni/θ-Al$_2$O$_3$, Ni/α-Al$_2$O$_3$ and Ni/MgAl$_2$O$_4$ Catalysts As catalysts for comparing reforming activity and catalytic stability against those of the catalyst according to the present invention, Ni/Ce—ZrO$_2$ (1:4)/θ-Al$_2$O$_3$ (Comparative Example 1), Ni/θ-Al$_2$O$_3$ (Comparative Example 2), Ni/α-Al$_2$O$_3$ (Comparative Example 3) and Ni/MgAl$_2$O$_4$ (Comparative Example 4) were prepared Ni/Ce—ZrO$_2$ (1:4)/θ-Al$_2$O$_3$ of Comparative Example 1 was prepared by the method of Example 2, and the nickel content was 2 wt. % against θ-Al$_2$O$_3$. Ni/θ-Al$_2$O$_3$ of Comparative Example 2 was prepared by precipitation, and the nickel content was 3 wt. % against θ-Al$_2$O$_3$. Ni/α-Al$_2$O$_3$ of Comparative Example 3 and Ni/MgAl$_2$O$_4$ of Comparative Example 4 were prepared by impregnation, and the nickel content was 15 wt. % against θ-Al$_2$O$_3$. α-Alumina was purchased from Strem Chemical (U.S.) and magnesium aluminate was purchased from Alpha Chemical. In these catalysts, nickel was supported through impregnation and they were calcined in 500° C. of air for 4 hr.

EXPERIMENTAL EXAMPLE 1

Determination of Reforming Activity of Nickel Reforming Catalyst in Steam Reforming of Methane Steam reforming of methane was performed in order to compare nickel reforming catalysts of Examples 1–10 with the catalysts of Comparative Examples 1–4. Catalytic activity was determined by the following method and the result is summerized in Table 1

Typical fixed bed catalytic reaction equipment manufactured at laboratory was used in catalytic activity determination. Firstly, catalyst was made to pellet having 1–2 mm particle size. After grinding the pellet in mortar, catalyst particles of 20–40 mesh was sieved and filled in a reactor. It was reduced with 5% hydrogen at 700° C. for 2 hr. 1:1 Mixture of methane and steam was injected into the reactor. The temperature of the reactor was regulated by an electric heater and a programmable thermostat (Hanyoung Electronics, HY P-100) to 600–1,000° C. Unless stated otherwise, gas was injected at 72,000 cc/hr·g-cat of space velocity when considering methane and steam only, using a mass flow controller. Composition of gas before and after synthesis gas production was analyzed with GC (Chrompack, CP 9001) directly connected to the reactor. A column (Chrompack, CarboPLOT P7) was used for gas separation. Activity of the reforming catalyst was measured with time at 750° C. and atmospheric pressure in order to determine its activity and thermal stability at high temperature. Initial activity and activity after 12 hr were determined from hydrogen yield in the product and methane conversion. The hydrogen yield was obtained from ratio of theoretical hydrogen concentration when 1 mol of methane reacts with 1 mol of steam to produce 3 mol of hydrogen and the actual hydrogen concentration. The result is shown in Table 1.

The catalytic activity ratio was determined by Equation 1.

$$A = \frac{\text{Methane conversion after 15 hr at 750° C.}}{\text{Initial methane conversion at 750° C.}} \quad \text{Equation 1}$$

$$B = \frac{\text{Hydrogen yield after 15 hr at 750° C.}}{\text{Initial hydrogen yield at 750° C.}}$$

TABLE 1

| Classification | Reforming Catalyst | Nickel Content* (wt. %) | 750° C., Initial Activity | | 750° C., After 15 hr | | Catalyst Activity Ratio (A/B) |
|---|---|---|---|---|---|---|---|
| | | | X (CH$_4$)** (%) | H$_2$ Yield (%) | X (CH$_4$)** (%) | H$_2$ Yield (%) | |
| Ex. 1 | Ni/Ce—ZrO$_2$/θ-Al$_2$O$_3$ | 3 | 71.2 | 71.3 | 70.9 | 71.0 | 1.00/1.00 |
| Ex. 2 | Ni/Ce—ZrO$_2$/θ-Al$_2$O$_3$ | 6 | 76.1 | 76.2 | 75.5 | 75.7 | 0.99/0.99 |
| Ex. 3 | Ni/Ce—ZrO$_2$/θ-Al$_2$O$_3$ | 12 | 82.3 | 82.3 | 82.5 | 82.4 | 1.00/1.00 |
| Ex. 4 | Ni/Ce—ZrO$_2$/θ-Al$_2$O$_3$ | 15 | 76.3 | 76.4 | 76.5 | 76.6 | 1.00/1.00 |
| Ex. 5 | Ni/La—ZrO$_2$/θ-Al$_2$O$_3$ | 12 | 72.7 | 73.0 | 71.5 | 72.6 | 0.98/0.99 |
| Ex. 6 | Ni—Ca/Ce—ZrO$_2$/θ-Al$_2$O$_3$ | 12 | 77.3 | 77.9 | 77.2 | 77.6 | 1.00/1.00 |
| Ex. 7 | Ni—Mg/La—ZrO$_2$/θ-Al$_2$O$_3$ | 12 | 70.4 | 71.0 | 70.6 | 71.4 | 1.00/1.00 |
| Ex. 8 | Ni—Ca/Y—ZrO$_2$/θ-Al$_2$O$_3$ | 12 | 72.3 | 72.8 | 69.5 | 70.8 | 0.96/0.97 |
| Ex. 9 | Ni—Ca/Ce—Mg—ZrO$_2$/θ-Al$_2$O$_3$ | 12 | 75.7 | 76.5 | 76.0 | 76.8 | 1.00/1.00 |
| Ex. 10 | Ni—Ca—Cs/La—ZrO$_2$/θ-Al$_2$O$_3$ | 12 | 68.8 | 70.2 | 66.1 | 67.8 | 0.96/0.97 |
| Com. Ex. 1 | Ni/Ce—ZrO$_2$/θ-Al$_2$O$_3$ | 2 | 2.3 | 2.8 | 0.0 | 0.0 | 0.00/0.00 |
| Com. Ex. 2 | Ni/θ-Al$_2$O$_3$ | 3 | 1.6 | 1.8 | 0.0 | 0.0 | 0.00/0.00 |
| Com. Ex. 3 | Ni/α-Al$_2$O$_3$ | 15 | 51.1 | 57.5 | 23.2 | 28.7 | 0.45/0.50 |
| Com. Ex. 4 | Ni/MgAl$_2$O$_4$ | 15 | 62.0 | 64.2 | 31.8 | 37.1 | 0.51/0.58 |

Note:
*Nickel Content (wt. %): against θ-Al$_2$O$_3$
**X (CH$_4$): methane conversion As shown in Table 1, Ni/Ce—ZrO$_2$/θ-Al$_2$O$_3$ showed initial methane conversion as large as 71–82% when the nickel content was in the range of 3 wt. % (Example 1)-15 wt. % (Example 4). And, the methane conversion was maintained almost after 15 hr. The initial hydrogen yield of larger than 71% was also maintained almost after 15 hr. Because these activity and stability is for a severe condition where methane-to-steam ratio is 1, higher methane conversion is expected for actual steam reforming operation, where excess steam is used. Further, much better stability is expected in the presence of excess steam. All of Ni/La—ZrO$_2$/θ-Al$_2$O$_3$ (Example 5), Ni—Ca/Ce—ZrO$_2$/θ-Al$_2$O$_3$ (Example 6), Ni—Mg/La—ZrO$_2$/θ-Al$_2$O$_3$ (Example 7), Ni—Ca/Y—ZrO$_2$/θ-Al$_2$O$_3$ (Example 8), Ni—Ca/Ce—Mg—ZrO$_2$/θ-Al$_2$O$_3$ (Example 9) and Ni—Ca—Cs/La—ZrO$_2$/θ-Al$_2$O$_3$ (Example 10) showed initial methane conversion larger than 69% and initial hydrogen yield larger than 70%. Also, they showed good stability with time. Therefore, they make good steam reforming catalysts.

On the contrary, Ni/Ce—ZrO$_2$/θ-Al$_2$O$_3$ (Comparative Example 1) with 2 wt. % of nickel showed initial methane conversion and hydrogen yield lower than 3%, and showed no activity after 15 hr. It is shown that high activity is obtained only when the nickel content is larger than 3 wt. % for steam reforming. Also, Ni/θ-Al$_2$O$_3$ (Comparative Example 2) with 3 wt. % of nickel showed initial methane conversion and hydrogen yield lower than 2%. Therefore only modified θ-Al$_2$O$_3$ shows good activity Ni/α-Al$_2$O$_3$ of Comparative Example 3 and Ni/MgAl$_2$O$_4$ of Comparative Example 4 showed initial methane conversion lower than 62% and the activity decreased below 50% after 15 hr. Considering that Ni/MgAl$_2$O$_4$ is a widely used catalyst, the catalyst according to the present invention, which shows much superior activity and stability, will be able to replace it. The catalyst according to the present invention is also advantageous in terms of cost, because only 5 wt. % of modifying component is applied on θ-Al$_2$O$_3$ base support.

EXPERIMENTAL EXAMPLE 2

Determination of Reforming Activity of Nickel Catalyst in Oxygen Reforming of Methane Oxygen reforming activity of nickel reforming catalysts prepared in Examples 1–10 and catalysts prepared in Comparative Example 1–4 was determined as follows.

The catalytic activity was determined as in Testing Example 1. However, oxygen was used instead of steam. Methane-to-oxygen molar ratio was set to 0.5. Gas was injected at 54,000 cc/hr·g-cat of space velocity using a mass flow controller (MKS Instrument).

Activity and thermal stability of the reforming catalyst at high temperature were determined at 750° C. and atmospheric pressure. Initial activity and activity after 200 min were determined by hydrogen yield in the product and methane conversion. The catalyst activity ratio was determined by Equation 2. The methane conversion and hydrogen yield are summerized in Table 2. The hydrogen yield in Table 2 is expressed in percentage of hydrogen partial pressure against 2 equivalents of methane partial pressure before reaction.

$$A = \frac{\text{Methane conversion after 200 min at 750° C.}}{\text{Initial methane conversion at 750° C.}} \quad \text{Equation 2}$$

$$B = \frac{\text{Hydrogen yield after 200 min at 750° C.}}{\text{Initial hydrogen yield at 750° C.}}$$

content was larger than 3 wt %. Ni/θ-$Al_2O_3$ with 3 wt. % of nickel (Comparative Example 2) had 75% of initial methane conversion and 68% of hydrogen yield, which are about 15% lower than those of Example 1 with the same nickel content. Therefore, modified θ-$Al_2O_3$ support showed better oxygen reforming activity. Ni/α-$Al_2O_3$ of Comparative Example 3 and Ni/$MgAl_2O_4$ of Comparative Example 4 showed poor stability with time. In Comparative Example 3, activity after 200 min dropped to 82% of the initial activity,

TABLE 2

| Classification | Reforming Catalyst | Nickel Content* (wt. %) | 750° C., Initial Activity | | 750° C., After 200 min | | Catalyst Activity Ratio (A/B) |
|---|---|---|---|---|---|---|---|
| | | | X ($CH_4$)** (%) | $H_2$ Yield (%) | X ($CH_4$)** (%) | $H_2$ Yield (%) | |
| Ex. 1 | Ni/Ce—$ZrO_2$/θ-$Al_2O_3$ | 3 | 89.4 | 84.3 | 89.4 | 85.1 | 1.00/1.01 |
| Ex. 2 | Ni/Ce—$ZrO_2$/θ-$Al_2O_3$ | 6 | 89.1 | 84.2 | 89.2 | 85.0 | 1.00/1.01 |
| Ex. 3 | Ni/Ce—$ZrO_2$/θ-$Al_2O_3$ | 12 | 89.7 | 84.3 | 89.7 | 84.4 | 1.00/1.00 |
| Ex. 4 | Ni/Ce—$ZrO_2$/θ-$Al_2O_3$ | 15 | 87.1 | 82.2 | 87.8 | 82.2 | 1.00/1.00 |
| Ex. 5 | Ni/La—$ZrO_2$/θ-$Al_2O_3$ | 12 | 85.7 | 81.0 | 85.5 | 80.9 | 1.00/1.00 |
| Ex. 6 | Ni—Ca/Ce—$ZrO_2$/θ-$Al_2O_3$ | 12 | 83.3 | 79.9 | 83.2 | 79.8 | 1.00/1.00 |
| Ex. 7 | Ni—Mg/La—$ZrO_2$/θ-$Al_2O_3$ | 12 | 80.5 | 74.2 | 80.6 | 74.4 | 1.00/1.00 |
| Ex. 8 | Ni—Ca/Y—$ZrO_2$/θ-$Al_2O_3$ | 12 | 81.8 | 75.8 | 81.5 | 76.0 | 1.00/1.00 |
| Ex. 9 | Ni—Ca/Ce—Mg—$ZrO_2$/θ-$Al_2O_3$ | 12 | 82.5 | 78.5 | 82.3 | 78.8 | 1.00/1.00 |
| Ex. 10 | Ni—Ca—Cs/La—$ZrO_2$/θ-$Al_2O_3$ | 12 | 80.8 | 76.5 | 80.7 | 76.8 | 1.00/1.00 |
| Com. Ex. 1 | Ni/Ce—$ZrO_2$/θ-$Al_2O_3$ | 2 | 10.3 | 10.1 | 10.5 | 10.3 | 1.00/1.00 |
| Com. Ex. 2 | Ni/θ-$Al_2O_3$ | 3 | 75.1 | 68.0 | 75.5 | 68.4 | 1.01/1.01 |
| Com. Ex. 3 | Ni/α-$Al_2O_3$ | 15 | 67.1 | 54.5 | 55.1 | 41.1 | 0.82/0.75 |
| Com. Ex. 4 | Ni/$MgAl_2O_4$ | 15 | 81.6 | 66.8 | 77.9 | 72.6 | 0.95/1.09 |

*Nickel Content (wt. %): against θ-$Al_2O_3$
**X ($CH_4$): methane conversion

As shown in Table 2, the reforming catalysts according to the present invention showed better activity and stability than those of Comparative Examples. Also, they have similar trend to that of Table 1.

Ni/Ce—$ZrO_2$/θ-$Al_2O_3$ with 3 wt. % (Example 1) to 15 wt. %(Example 4) of nickel showed initial methane conversion as high as 87–89%. And, the methane conversion was maintained almost after 200 min. The initial hydrogen yield was larger than 82%, and was maintained almost after 200 min. Also, all of Ni/La—$ZrO_2$/θ-$Al_2O_3$ (Example 5), Ni—Ca/Ce—$ZrO_2$/θ-$Al_2O_3$ (Example 6), Ni—Mg/La—$ZrO_2$/θ-$Al_2O_3$ (Example 7), Ni—Ca/Y—$ZrO_2$/θ-$Al_2O_3$ (Example 8), Ni—Ca/Ce—Mg—$ZrO_2$/θ-$Al_2O_3$ (Example 9) and Ni—Ca—Cs/La—$ZrO_2$/θ-$Al_2O_3$ (Example 10) showed initial methane conversion larger than 80% and initial hydrogen yield larger than 74%. And, they were stable after 200 min. Therefore, they have superior property as oxygen reforming catalysts.

On the contrary, Ni/Ce—$ZrO_2$/θ-$Al_2O_3$ (Comparative Example 1) with 2 wt. % of nickel had initial methane conversion and hydrogen yield as low as 10%. They showed significant oxygen reforming activity only when the nickel and in Comparative Example 4 to 95% Consequently, the catalyst according to the present invention has superior activity and stability in oxygen reforming, as well as in steam reforming.

TESTING EXAMPLE 3

Determination of Reforming Activity of Nickel Catalyst in Steam-Oxygen Reforming of Methane Steam-oxygen reforming activity of catalysts was determined as follows. The result is summarized in Table 3.

Other conditions were the same as those of Testing Example 1. For the reactant, 2:1:1 mixture of methane:oxygen:steam was injected into the reactor. The temperature of the reactor was set to 750° C. The space velocity of the gas was controlled to 90,000 cc/hr·g-cat with a mass flow controller (MKS Instrument).

Initial activity and activity after catalytic activity 200 min were determined at 750° C. and atmospheric pressure by methane conversion and hydrogen yield, as in (Testing Example 2. The catalyst activity ratio for methane conversion was determined by Equation 2.

TABLE 3

| Classification | Reforming Catalyst | Nickel Content* (wt. %) | 750° C., Initial Activity | | 750° C., After 200 min | | Catalyst Activity Ratio (A/B) |
|---|---|---|---|---|---|---|---|
| | | | X (CH$_4$)** (%) | H$_2$ Yield (%) | X (CH$_4$)** (%) | H$_2$ Yield (%) | |
| Ex. 1 | Ni/Ce—ZrO$_2$/θ-Al$_2$O$_3$ | 3 | 91.2 | 102 | 92.0 | 102 | 1.00/1.00 |
| Ex. 2 | Ni/Ce—ZrO$_2$/θ-Al$_2$O$_3$ | 6 | 94.9 | 101 | 95.0 | 103 | 1.00/1.02 |
| Ex. 3 | Ni/Ce—ZrO$_2$/θ-Al$_2$O$_3$ | 12 | 97.4 | 104 | 99.1 | 107 | 1.02/1.03 |
| Ex. 4 | Ni/Ce—ZrO$_2$/θ-Al$_2$O$_3$ | 15 | 96.5 | 102 | 97.9 | 104 | 1.01/1.02 |
| Ex. 5 | Ni/La—ZrO$_2$/θ-Al$_2$O$_3$ | 12 | 89.7 | 98 | 90.5 | 99 | 1.01/1.01 |
| Ex. 6 | Ni—Ca/Ce—ZrO$_2$/θ-Al$_2$O$_3$ | 12 | 92.3 | 103 | 92.7 | 104 | 1.00/1.01 |
| Ex. 7 | Ni—Mg/La—ZrO$_2$/θ-Al$_2$O$_3$ | 12 | 88.5 | 97 | 90.0 | 98 | 1.02/1.01 |
| Ex. 8 | Ni—Ca/Y—ZrO$_2$/θ-Al$_2$O$_3$ | 12 | 89.3 | 98 | 89.5 | 98 | 1.00/1.00 |
| Ex. 9 | Ni/Ca/Ce—Mg—ZrO$_2$/θ-Al$_2$O$_3$ | 12 | 91.5 | 102 | 92.0 | 103 | 1.01/1.01 |
| Ex. 10 | Ni—Ca—Cs/La—ZrO$_2$/θ-Al$_2$O$_3$ | 12 | 88.8 | 97 | 88.1 | 97 | 0.99/1.00 |
| Com. Ex. 1 | Ni/Ce—ZrO$_2$/θ-Al$_2$O$_3$ | 2 | 3.9 | 4.3 | 2.2 | 2.5 | 0.56/0.58 |
| Com. Ex. 2 | Ni/θ-Al$_2$O$_3$ | 3 | 3.4 | 4.8 | 2.8 | 4.4 | 0.82/0.92 |
| Com. Ex. 3 | Ni/α-Al$_2$O$_3$ | 15 | 77.1 | 81 | 65.5 | 68 | 0.85/0.84 |
| Com. Ex. 4 | Ni/MgAl$_2$O$_4$ | 15 | 93.1 | 97 | 91.0 | 95 | 0.98/0.98 |

Note:
*Nickel Content (wt. %): against θ-Al$_2$O$_3$
**X (CH$_4$): methane conversion As shown in Table 3, the reforming catalysts according to the present invention showed better activity and stability than those of Comparative Examples. Also, they have similar trend to that of steam reforming and oxygen reforming.

Ni/Ce—ZrO$_2$/θ-Al$_2$O$_3$ with 3 wt. % (Example 1) to 15 wt. % (Example 4) of nickel showed initial methane conversion larger than 90%. And, the methane conversion was maintained after 200 min without deactivation. The initial hydrogen yield larger than 100% was maintained after 200 min. The hydrogen yield larger than 100% is due to hydrogen production through water gas shift reaction by carbon monoxide and steam, other than hydrogen production through oxygen reforming. Also, all of Ni/La—ZrO$_2$/θ-Al$_2$O$_3$ (Example 5), Ni—Ca/Ce—ZrO$_2$/θ-Al$_2$O$_3$ (Example 6), Ni—Mg/La—ZrO$_2$/θ-Al$_2$O$_3$ (Example 7), Ni—Ca/Y—ZrO$_2$/θ-Al$_2$O$_3$ (Example 8), (Ni—Ca/Ce—Mg—ZrO$_2$/θ-Al$_2$O$_3$ (Example 9) and Ni—Ca—Cs/La—ZrO$_2$/θ-Al$_2$O$_3$ (Example 10) showed initial methane conversion larger than 88% and initial hydrogen yield larger than 97%. And, they were stable after 200 min. Therefore, they have superior property as steam-oxygen reforming catalysts.

On the contrary, Ni/Ce—ZrO$_2$/θ-Al$_2$O$_3$ (Comparative Example 1) with 2 wt. % of nickel had initial methane conversion and hydrogen yield lower than 5%. They showed significant steam-oxygen reforming activity only when the nickel content was larger than 3 wt. %. Ni/θ-Al$_2$O$_3$ with 3 wt. % of nickel (Comparative Example 2) had initial methane conversion and hydrogen yield lower than 5%, which are much lower than those of Example 1 with the same nickel content. Therefore, only modified θ-Al$_2$O$_3$ support shows good steam-oxygen reforming activity. Ni/α-Al$_2$O$_3$ of Comparative Example 3 and Ni/MgAl$_2$O$_4$ of Comparative Example 4 showed poor stability with time. In Comparative Example 3, activity after 200 min dropped to 85% of the initial activity, and in Comparative Example 4 to 98%. Consequently, the catalyst according to the present invention has superior activity and stability in steam-oxygen reforming.

As explained above, modified θ-Al2O3-supported nickel reforming catalyst according to the present invention is a new-concept nickel reforming catalyst, and if it is used for producing synthesis gas from methane natural gas, methane conversion can be increased in steam reforming, oxygen reforming and steam-oxygen reforming. Also, it has good catalytic stability. And, because inexpensive θ-Al$_2$O$_3$ is used as base support and only small amount of expensive zirconia or other metal components are used, it is very cost-effective

What is claimed is:

1. A θ-Al$_2$O$_3$-supported nickel reforming catalyst expressed by the following formula 1, which is used for producing synthesis gas mixture of carbon monoxide and hydrogen from natural gas:

$$M_1-M_2-Ni/M_3-M_4-ZrO_2/\theta\text{-}Al_2O_3 \qquad (1)$$

wherein $M_1$ is an alkali metal; each of $M_2$ and $M_3$ is an alkaline earth metal; and $M_4$ is a IIIB element or a lanthanide, wherein the nickel reforming catalyst is composed of:

3–20 wt. % of nickel (Ni) against $\theta\text{-Al}_2\text{O}_3$;

0–0.2 molar equivalent of $M_1$ and 0–4 molar equivalent of $M_2$ cocatalysts against nickel;

0–1.0 molar equivalent of $M_3$ and 0.01–1.0 molar equivalent of $M_4$ against zirconium; and 0.01–1.0 molar equivalent of $ZrO_2$ against $\theta\text{-Al}_2\text{O}_3$.

2. A nickel reforming catalyst according to claim 1, wherein said $\theta\text{-Al}_2\text{O}_3$ support is modified with modified zirconia ($M_3$—$M_4$—$ZrO_2$) by coprecipitation or sol-gel method.

3. A nickel reforming catalyst according to claim 1, wherein said nickel and cocatalyst ($M_1$—$M_2$—Ni) is supported on the modified support ($M_3$—$M_4$—$ZrO_2/\theta\text{-Al}_2\text{O}_3$) through molten-salt or impregnation.

* * * * *